United States Patent [19]

Kahley, Sr.

[11] 4,114,391
[45] Sep. 19, 1978

[54] TAPE LAYING TRENCHING APPARATUS

[76] Inventor: Vance F. Kahley, Sr., 3231 S. Eldredge, Salt Lake City, Utah 84115

[21] Appl. No.: 780,898

[22] Filed: Mar. 24, 1977

[51] Int. Cl.² .............................................. E02F 5/12
[52] U.S. Cl. ..................................... 405/176; 37/193; 405/181
[58] Field of Search ...................... 61/72.6, 72.5, 105, 61/106; 37/193; 111/5

[56] References Cited

U.S. PATENT DOCUMENTS

| 1,490,502 | 4/1924 | Barnhart | 37/193 |
| 2,663,515 | 12/1953 | Kinsinger | 61/72.6 X |
| 3,559,414 | 2/1971 | Pike et al. | 1/72.6 |
| 3,777,500 | 12/1973 | Kelley | 61/72.6 |

Primary Examiner—Jacob Shapiro
Attorney, Agent, or Firm—H. Ross Workman; J. Winslow Young

[57] ABSTRACT

A tape laying, trenching apparatus adapted to be drawn behind a vehicle for the purpose of depositing a tape beneath the surface of the earth. The tape is an identification tape and serves as an underground installation identification means. The trenching apparatus includes a wheel-mounted drawbar and a vertically adjustable trenching tool. The trenching tool includes a hollow column and a trenching blade at the foot of the column. A tape dispenser is attached to the upper end of the column and accomodates feeding the tape downwardly through the column to a position behind the trenching blade. The trenching tool is releasably attachable to the drawbar at a plurality of lower, trenching positions and at an upper, traveling position. A strut is interconnectable between the drawbar and the column to support the trenching tool in both the trenching and the traveling positions. The trenching apparatus also includes a tool box mounted on the framework and a drag for backfilling the trench as the tape is being laid.

6 Claims, 3 Drawing Figures

TAPE LAYING TRENCHING APPARATUS

BACKGROUND

1. Field of the Invention

This invention relates to tape laying, trenching apparatus and, more particularly, to a tape laying, trenching apparatus wherein the trenching tool is carried in either a first, traveling position at an elevation above the surface of the earth and a second, trenching position wherein the trenching blade can be drawn through the earth at one of a plurality of preselectable working depths.

2. The Prior Art

Numerous devices are known in the art for the purpose of depositing a cord, cable, conduit, seed tape or the like beneath the surface of the earth. Some of these inventions are disclosed in the following U.S. Pat. Nos. 781,568; 882,649; 1,292,082; 1,513,937; 1,886,511; 2,155,044; 2,647,758; 3,339,369; and 3,729,060. From the foregoing references, it is clear that numerous inventions are available relating to the art of depositing some form of continuous filament below the earth's surface.

Unfortunately, until recently, very little has been done toward suitably marking an underground installation for the purpose of identifying the installation for protection, subsequent interconnection therewith, protection, or even removal. Protection and identification of the underground installation is particularly important in view of the inconvenience and even hazards associated with damage to an underground installation such as a telephone cable system, a water line, sewer line, gas main, electrical power transmission systems, and the like. Customarily, the appropriate utility company maintains maps and diagrams which are allegedly accurate with respect to location of the respective underground installation. However, experience has shown that these maps or charts are not always accurate. Additionally, the charts are accessible only upon prior notification to the particular utility company.

In view of the foregoing, it has become a common practice to place an identification tape over the underground installation. This is done after the trench has been partially backfilled and before completion of the remainder of the backfilling operation. The identification tape is usually in the form of a metallic tape so as to accommodate its being detected by a conventional metal detector and/or a highly visible material of fabrication which will render the identification tape readily visible in the event it is inadvertently excavated during a subsequent excavation operation.

Unfortunately, the placement of an identification tape in a partially backfilled trench is not always feasible and is, therefore, frequently disregarded. This latter problem has been alleviated to a degree by the development of an identification tape plow as set forth in U.S. Pat. No. 3,339,369. However, the tape identification plow set forth in this patent tends to be complicated and does not appear to be readily adapted for transportation between one working location and another.

In view of the foregoing what is needed is an identification tape laying, trenching device which is simple to fabricate, inexpensive to operate, and readily adaptable to be easily transported between locations. Transportability would enhanced by providing an apparatus which is readily assembled into either a trenching or traveling configuration. It would be an even further advancement in the art to provide a vertically adjustable, identification tape laying, trenching device having a support strut which is readily interchangeable between the working and the traveling positions. Such an invention is disclosed and claimed herein.

BRIEF SUMMARY AND OBJECTS OF THE INVENTION

The present invention relates to a trenching apparatus for laying a tape beneath the surface of the earth, the tape serving as an indicating device to indicate the position of an underground utility line, pipeline or the like. The trenching apparatus is wheel-mounted and includes a drawbar with an upright trenching tool. The trenching tool is vertically and adjustably attachable to the drawbar. The trenching tool is held in the vertical position by a strut interconnected between the drawbar and a column portion of the trenching tool in either a raised, traveling position or a lowered, trenching position.

It is, therefore, a primary object of this invention is to provide improvements in tape-laying, trenching apparatus.

Another object of this invention is to provide a tape-laying, trenching apparatus wherein a trenching blade is readily interchangable between a raised, traveling position and a lowered, working position.

Another object of this invention is to provide a method for depositing a tape below the surface of the earth whereby the tape may serve as an indicator for an underlying utility line or the like.

Another object of this invention is to provide a tape-laying, trenching apparatus wherein the apparatus is quickly convertible into either of the traveling or the working positions.

These and other objects and features of the present invention will become more fully apparent from the following description and appended claims taken in conjunction with the accompanying drawing.

DETAILED DESCRIPTION OF THE PREFERRED EMBODIMENTS

Figure 1:
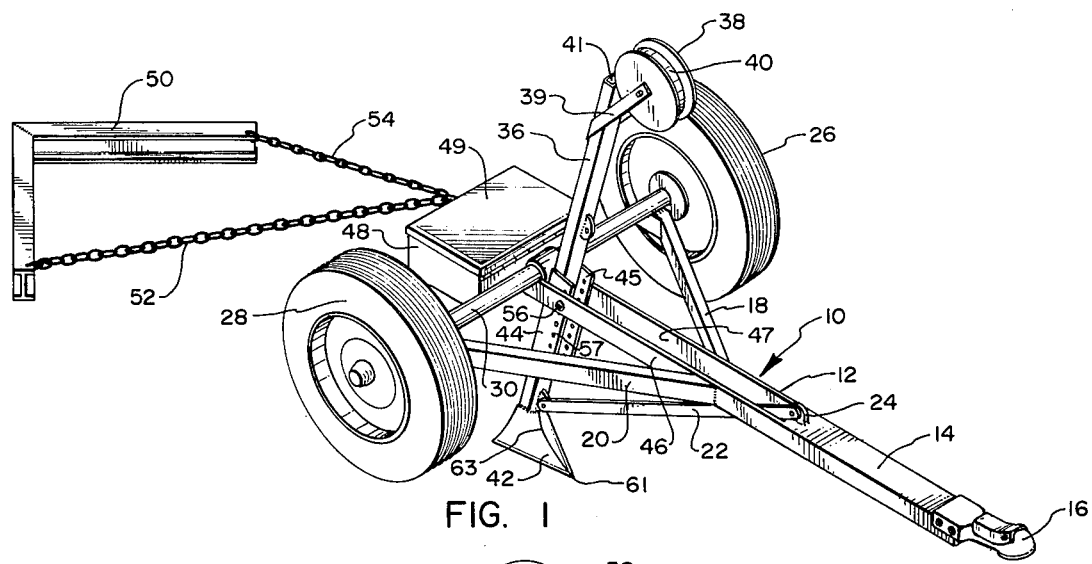
FIG. 1 is a perspective view of the tape-laying, trenching apparatus of this invention in the working configuration.

The invention is best understood by reference to the drawing wherein like parts are designated with like numerals throughout.

Figure 2:
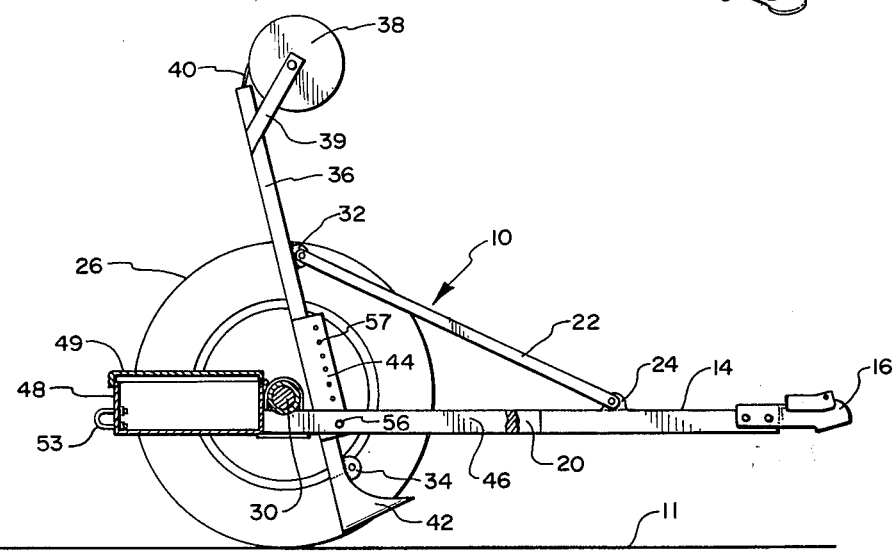
FIG. 2 is a side elevation of the trenching apparatus of this invention in the travel position shown in partial cross section.
Figure 3:
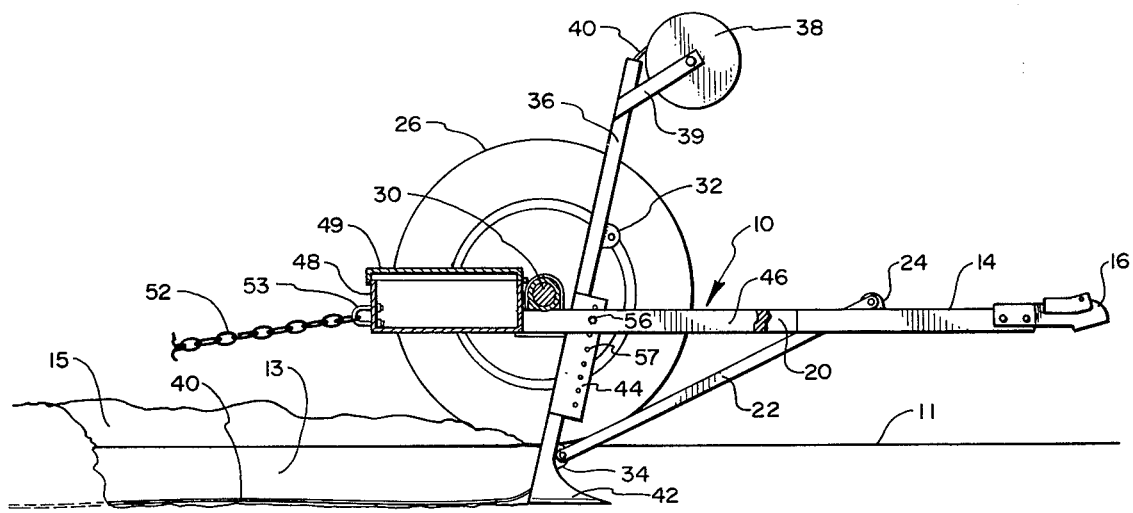
FIG. 3 is a side elevation of the trenching apparatus of this invention in the working configuration and shown in partial cross section.

Referring to FIGS. 1 - 3, the trenching apparatus of this invention is shown generally at 10 and includes a frame 12 mounted on a pair of wheels 26 and 28. Frame 12 is formed from a drawbar 14 interconnected to an axle 30 and rigidly supported thereto by lateral braces 18 and 20. A hitch 16 is secured to the forward end of drawbar 14 and accommodates releasably attaching trenching apparatus 10 to a corresponding trailer hitch on a vehicle (not shown).

Drawbar 14 is configured as an inverted channel iron at the forward end and is formed into two spaced side beams 46 and 47 which interconnect with axle 30. The space between side beams serves as a receiving channel for a vertical column 36 and, as circumstances dictate, a strut 22. Column 36 has a trenching blade 42 attached to its lower end, the combination forming the trenching tool portion of the trenching apparatus 10. Column 36 is vertically adjustable and pivotally connected to side beams 46 and 47 by a pin 56. Strut 22 supports column 36 in its vertical orientation with respect to drawbar 14. Vertical adjustment between column 36 and drawbar 14 is attained by means of a pair of side flanges 44 and 45 welded to the sides of column 36 and in juxtaposition with side beams 46 and 47, respectively. A plurality of apertures 57 in each of side flanges 44 and 45 are adapted to be placed in registry with an aperture in each of side beams 46 and 47 so as to receive pin 56.

Column 36 is configured as a hollow column with a hollow 41 (FIG. 1) therein for the purpose of admitting a tape 40. Tape 40 is passed downwardly through hollow 41 so as to be deposited in a trench 13 (FIG. 3) behind trenching blade 42. Tape 40 is dispensed from a reel 38 rotatably mounted upon the ends of side braces 39 welded to column 36. The alignment of reel 38 is such that it readily feeds tape 40 downwardly through the hollow 41 (FIG. 1) of column 36.

Strut 22 is pivotally attached at one end to drawbar 14 at an upright flange 24. The other end of strut 22 may be alternately interconnected to vertical column 36 at either of flanges 32 or 34 (FIGS. 2 and 3). For example, with reference to FIGS. 1 and 3, pin 56 is inserted in an upper aperture 57 in side flanges 44 and 45 so as to lower column 36 and, more particularly, trenching blade 42 on the base thereof to a position below the level of earth surface 11. Correspondingly, strut 22 is interconnected between flanges 24 and 34 to thereby provide the necessary support for trenching blade 42 when the same is drawn through the earth to displace earth 15 and thereby create trench 13. This particular configuration is known as the working position. In the working configuration shown, a continuous band of tape 40 is dispensed from reel 38 downwardly through column 36 into the bottom of trench 13. After tape 40 has been deposited in the bottom of trench 13, a drag 50 is pulled along the length of trench 13 and by its configuration redeposits earth 15 in trench 13 thereby covering tape 40 with earth.

Trenching blade 42 is formed with a triangular configuration having a leading apex 60 and a raised midrib 63. The raised midrib 63 raises earthen material 15 upwardly and outwardly from trenching blade 42 to permit tape 40 to be deposited in the bottom of the resulting trench 13. Clearly, most of earthen material 15 will fall back into trench 13 after passage of trenching blade 42. However, drag 50 serves to complete the refilling of trench 13 and to form a smooth surface thereover.

Drag 50 is fabricated with a V configuration with the upper end of each arm of the V configuration being attached to a chain 52 and a chain 54 (FIG. 1). Each of chains 52 and 54 are connected to a hook 53 mounted as an integral part of trenching apparatus 10. In the particular configuration illustrated herein, each arm of the V configuration of drag 50 deflects earthen material 15 toward the center of drag 50 thereby redepositing earthen material 15 in trench 13 to more efficiently refill the same after tape 40 has been deposited therein.

With particular reference to FIG. 2, the traveling configuration of trenching apparatus 10 is shown. Trenching apparatus 10 is prepared for towing in a nonoperating condition by removing pin 56 from the upper aperture 57. Strut 22 is disconnected from flange 34 and interconnected with flange 32 so as to securely support column 36 at the desired elevated position. Column 36 is raised until the appropriate apertures at the lower end of side flanges 44 and 45 and side beams 46 and 47 are again in registry. Reinsertion of pin 56 pivotally interlocks column 36 to drawbar 14 at an elevated position with trenching blade 42 supported above earth surface 11. In this manner, trenching apparatus 10 is configured to be towed by a vehicle (not shown).

Trenching apparatus 10 is completed by the inclusion of a tool box mounted to the rear of axle 30. Tool box 48 includes a lid 49 and a u-bolt assembly 53 as an integral part thereof. Tool box 48 serves as an accessory chamber for additional reels of tape 40, tools and the like. Additionally, drag 50 may be, selectively, secured to the top of lid 49 to further facilitate the movement of trenching apparatus 10 from one location to another.

The Method

The method of this invention involves raising column 36 and, more particularly, trenching blade 42 above earch surface 11 by pivotally bolting side members 44 and 45 (FIG. 1) to side beams 46 and 47 (FIG. 1) at one of the lowermost apertures 57. With column 36 thus raised, strut 22 is interconnected between flanges 24 and 32 to provide the necessary support of column 36 during transit. Thereafter, trailer hitch 16 is connected with a corresponding trailer hitch assemby on a vehicle (not shown). Trenching apparatus is readily pulled from one location to another with wheels 26 and 28 rolling over earch surface 11.

Upon reaching a working location, trenching apparatus 10 is readily prepared for operation in the working configuration by repositioning strut 22 between flanges 24 and 34 and lowering column 36 by re-engaging pin 56 at an upper aperture in side flanges 44 and 45. The vertical depth adjustment of column 36 and, more particularly, trenching blade 42, may be easily provided by selectively positioning pin 56 in any of the desired apertures 57 in side flanges 44 and 45. With the depth thus preselected, tape 40 is fed downwardly through hollow 41 (FIG. 1) of column 36 so as to permit the same to be deposited in trench 13 which is prepared by by pulling trenching blade 42 through earth 11.

Prior to commencing operation, drag 50 is interconnected to hook 53 by means of chains 52 and 54 and placed in a position on earth 11 behind trenching apparatus 10. The trenching operation is commenced by the mechanized vehicle (not shown) pulling against trailer hitch 16 and, more particularly, drawbar 14 so as to pull trenching apparatus 10 over the surface of the earth 11.

Wheels 26 and 28 roll over the surface of earth 11 while trenching blade 42 is pulled forwardly through the earth to create trench 13. The particular shape of trenching blade 42 deflects earthen material 15 upwardly out of trench 13. The upward thrusting of earthen material 15 by the upslope shape of midrib 63 tends to exert a downward pull against column 36 to keep trenching blade 42 from being forced upwardly. The penetration depth of trenching blade 42 is restricted to the depth preselected upon placement of pin 56 in apertures 57 by wheels 26 and 28 being in engagement with earth 11. The rearward pulling against trenching blade 42 is transmitted directly to drawbar 14 by means of strut 22.

Accordingly, a suitable identification tape 40 is quickly and easily deposited in trench 13 and thereafter covered with the displaced earthen material 15 by the following drag 50. Trenching apparatus 10 thereby provides a simple, inexpensive, and readily transportable apparatus for the placement of a desired identification tape 40 over a pipeline, buried utility line, or the like. Importantly, the apparatus of this invention is readily transportable from one location to another with a minimum of adjustment requirements between the traveling and the working positions as may be readily ascertained from the foregoing.

The invention may be embodied in other specific forms without departing from its spirit or essential characteristics. The described embodiments are to be considered only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a U.S. Letters Patent is:

1. An apparatus for continuously depositing a tape below the surface of the earth comprising in combination:
   a wheel-mounted drawbar, the drawbar accommodating attachment to a vehicle, the vehicle pulling the apparatus forwardly over the earthen surface;
   a vertically oriented column demountably attachable to the drawbar in a plurality of vertically adjustable positions;
   a trenching blade on the lower end of the column
   a plurality of attachment sites on the column for releasably attaching the column to the drawbar at a plurality of vertically adjustable positions relative to the drawbar, the lowermost position supporting the trenching blade above the earthen surface;
   the first lower, strut attachment site adjacent the lower end of the column;
   a second, upper, strut attachment site adjacent the upper end of the column;
   a strut selectively interconnectable between the drawbar and the column, the strut being selectively interconnected to said lower, strut attachment site thereby supporting the column in a first, trenching position with the trenching blade pulled through the earth an incremental distance below the earth's surface, said lower, strut attachment site thereby serving as a connection point for the strut when the column is lowered into said first, trenching position and the column is secured to the drawbar at one of the plurality of attachment sites, and a second, travel position wherein the column and, more particularly, the trenching blade is carried above the level of the earth's surface by selectively interconnecting the strut to the column at the upper, strut attachment site and the column to the drawbar at the lowermost position of the plurality of attachment sites; and
   a tape dispenser mounted adjacent the column to accommodate feeding the tape downwardly along at least a portion of the column to a position adjacent the trenching blade.

2. The apparatus defined in claim 1 wherein the column is hollow, the hollow communicating between the tape dispenser and the trenching blade to thereby accommodate passing tape downwardly therethrough.

3. The apparatus defined in claim 1 wherein the trenching blade is configured with a generally triangular configuration with an apex oriented in a direction along the line of travel of the apparatus, the trenching blade having sufficient thickness to accommodate at least raising the overlying earth to permit the deposition of tape thereunder.

4. The apparatus defined in claim 1 wherein the plurality of attachment sites accommodate securing the column to the drawbar at a plurality of trenching blade depths.

5. A trenching apparatus for depositing a tape in the earth an incremental distance below the surface of the earth and behind a trenching blade, the trenching apparatus accommodating being drawn behind a vehicle in a first, travel position with the trenching blade raised above the earth surface and a second, trenching position with the trenching blade being drawn through the earth a predetermined, incremental distance below the surface of the earth comprising:
   a wheel-mounted drawbar adapted to be pulled by a vehicle with the wheels in continuous contact with the earth's surface when the trenching blade is in both the first, travel position and the second, trenching position;
   a vertically adjustable column with the trenching blade mounted on the lower end of the column, the column including a hollow lumen communicating between an upper end of the column and an opening behind the trenching blade, the hollow lumen accommodating passage of a tape downwardly through the column, the column including a single, upper attachment site and a single, lower attachment site at the lower end of the column adjacent the trenching blade, the column further including a plurality of attachment sites arrayed vertically along the upper portion of the column to accommodate attachment of the column to the drawbar in a plurality of vertically directed positions to thereby suitably adjust the depth at which the trenching blade is drawn through the earth;
   a strut interconnectable between the drawbar and the column at the single, lower attachment site to support the column in its second, trenching position while the column is attached to the drawbar at one of the plurality of attachment sites, the strut also being interconnectable between the drawbar and the single, upper attachment site when column is attached to the drawbar at one of the plurality of attachment sites, thereby securing the column and the trenching blade in a travel position with the trenching blade suspended above the earth surface;
   the trenching blade having a forwardly directed apex and a raised midrib to accommodate lifting earthen material sufficiently to allow depositioof the tape thereunder; and
   a tape dispenser mounted on the apparatus to accommodate feeding tape downwardly through the hollow lumen when the column is lowered into the second, trenching position.

6. A method for identifying an underground installation by burying an overlying identification in the earth comprising the steps of:
   releasably securing a trenching tool having a vertically oriented, hollow column to a wheel-mounted drawbar assembly;
   selectively interconnecting the column to the drawbar with a strut in a first, trenching position with the column lowered with respect to the drawbar and the strut interconnected between the drawbar and a lower end of the column, and in a second, traveling position with the column raised with respect to the drawbar and the strut interconnected between the drawbar and an upper end of the column;

rotatably mounting a reel of identification tape to the upper end of the column to accommodate feeding tape downwardly through the hollow column;

pulling the trenching tool from place to place with the column raised to the second, traveling position; and installing an identification tape underneath the earth at a position overlying an underground installation by lowering the column to first, trenching position and pulling the trenching tool along the underground installation while feeding the tape downwardly through the column into the earth.

* * * * *